INFORMATION HANDLING AND STORING APPARATUS

Filed Feb. 23, 1966

INVENTOR.
ROBERT E. SPINNER
DAVID F. WOLFE

United States Patent Office 3,374,932

Patented Mar. 26, 1968

3,374,932

INFORMATION HANDLING AND STORING APPARATUS

Robert E. Spinner, 26 Deer Trail Road, North Caldwell, N.J. 07006, and David F. Wolfe, 173 Riverside Drive, New York, N.Y. 10024

Filed Feb. 23, 1966, Ser. No. 529,482
6 Claims. (Cl. 225—93)

ABSTRACT OF THE DISCLOSURE

The disclosure is of information-handling apparatus comprising a housing which includes a pair of reels, one a supply reel and one a takeup reel, between which a master information roll is supported. The master information roll includes columns of apertures, each aperture being associated with a unit of information, with the columns offset laterally and longitudinally from each other along the roll. An information-receiving member positioned beneath the roll is used to enter information from each column of apertures in the roll.

This invention relates to apparatus for handling and storing information and, particularly, for entering and storing information in blank punch cards.

There are many types of data collecting and processing operations which are still performed by human operators, with or without the ultimate assistance of electronic computers. The taking of public opinion polls is one operation of this type. Poll-taking generally includes the steps of preparing a list of questions on one or more sheets of paper, interviewing an individual, and marking the given answers for each person interviewed on a sheet of paper, returning the answer sheets to a headquarters, entering the various answers in blank punch cards, and, finally, processing the punch cards through a computer. It is clear that a relatively large number of operating steps and sheets of paper are involved in such a poll-taking operation, and, as a result, considerable time and manpower are required.

Accordingly, the objects of the present invention generally concern the provision of apparatus for simplifying and speeding up information-taking and processing operations.

The objects of the invention also concern the provision of improved apparatus for handling units of information and for entering and storing units of information in a punch card, the apparatus also being adapted to facilitate read-back of stored information.

Briefly, apparatus embodying the invention includes a housing which contains a supply reel and a takeup reel which carry and operate a master information roll. The housing has an apertured front wall in which is mounted an information-entering assembly which includes, among other things, a blank punch card in which information from the master roll is to be entered. The blank punch card carries a plurality of columns of scored areas, and the master roll carries a plurality of laterally and longitudinally spaced columns of apertures, each of which represents and is associated with a unit of information. As the master roll is fed from one reel to the other, it passes over the blank punch card, and, as it is rolled, a first column of apertures is aligned with the first column of scored areas in the punch card and information is entered in the punch card by removing selected scored areas; then, the master roll is moved again until the next column of apertures, offset laterally and longitudinally from the first, is aligned with the next column of scored areas in the blank punch card and information is entered therein. This operation is continued, with each column of apertures in the master roll being aligned with a separate column of scored areas in the blank punch card and information entered therein.

The invention is described in greater detail by reference to the drawing wherein.

Figure 2:
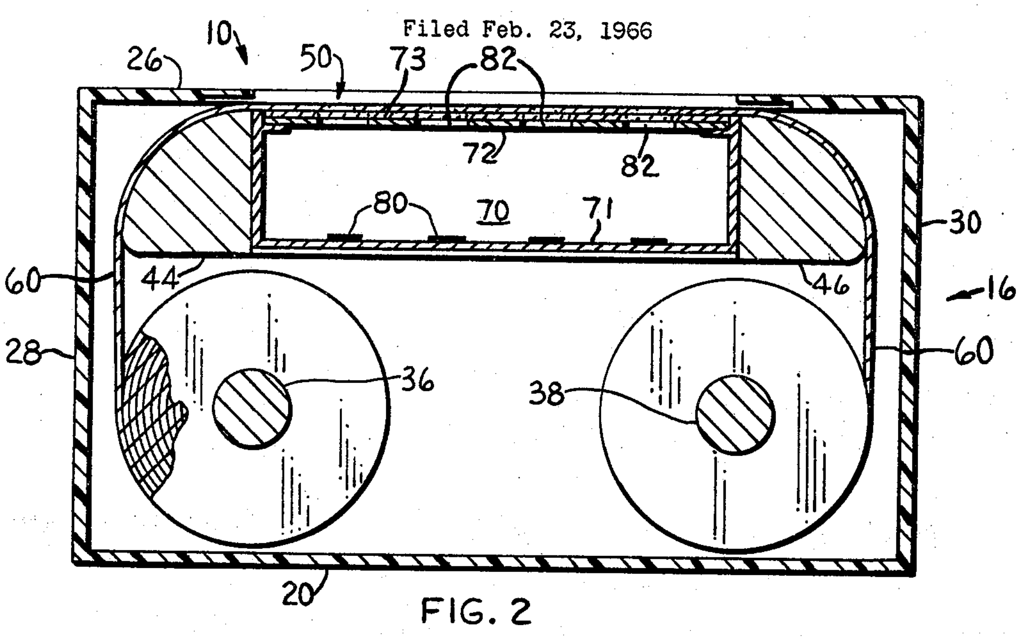
FIG. 2 is an elevational view, partly in section, of the invention.
Figures 1, 3:
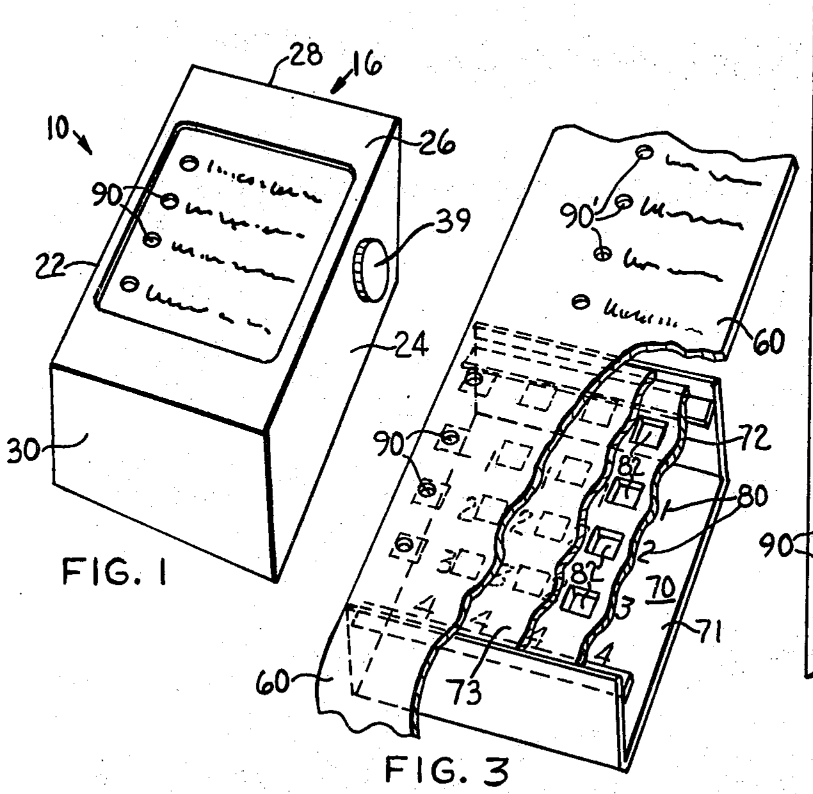
FIG. 1 is a perspective view of the invention.
FIG. 3 is a perspective view, partly in section, of a portion of the apparatus of FIG. 1.
Figure 4:
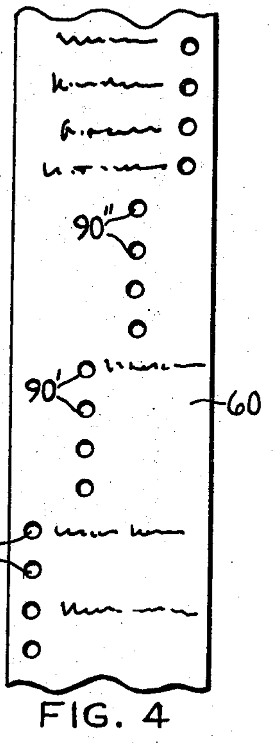
FIG. 4 is a plan view of a portion of the invention.

The information-entering apparatus of the invention 10 includes a housing 16 which comprises a base 20, two side walls 22 and 24, an apertured top wall 26, and two end walls 28 and 30. A pair of reels 36 and 38 are suitably rotatably supported between the side walls 22 and 24. These reels are oriented parallel to each other, to the base 20, and to the apertured top wall 26. An operating handle or knob 39 (not shown) is secured through the housing to the reel 38 which is considered to be the takeup reel. The reels could also be motor-driven, if desired.

A pair of paper guides 44 and 46 are mounted inside the housing 16 adjacent to the aperture 50 in the front wall 26 and generally at opposite ends thereof. The curved surfaces of the paper guides are positioned so that a roll of paper 60 rides on them as the paper is drawn from one reel to the other. The paper guides may also be in the form of rolls or the like.

An information-entering assembly 70 is mounted inside the housing 16 so that it is accessible through the apertured front or top wall 26. The housing of assembly 70 is generally box-like and includes a base 71 and, spaced above and parallel to the base, a rigid support plate 72 of metal or the like, and, on the support plate, is disposed a blank punch card 73. The base 71 itself or a blank card resting thereon is provided with a plurality of columns of numbers or other indicia which correspond to and identify information in a master information roll to be described. The support plate 72 is provided with a plurality of columns of apertures 82 which are vertically aligned with the columns of numbers 80 on the base 71. The punch card 73 is provided with removable scored areas or the like arranged in columns corresponding to the columns of apertures in the support plate 72.

The information to be entered in the punch card is carried on the roll of paper 60 which is a master information roll. The roll 60 is mounted on supply reel 36 and is rolled up on takeup reel 38. The roll of paper 60 carries a plurality of longitudinally spaced columns of apertures 90, with each column being laterally offset from adjacent columns. Thus, the first column of apertures at the beginning of the roll is positioned adjacent to the edge of the roll and is aligned with and overlies the first column of scored areas in the blank punch card. The next column of apertures 90′ is offset laterally from apertures 90, and the next column of apertures 90″ is further offset from apertures 90′. Each aperture in each column in the information roll represents a unit of information or a question or the like which may be printed adjacent to the aperture to which it relates. As the information roll 60 is rolled up on the takeup reel 38, each column of information apertures 90, offset laterally from the one before it, is aligned with a different column of scored areas in the punch card 73.

The apparatus 10 is used as follows. With a blank punch card in place and with the information roll 60 secured to both reels 36 and 38, the roll is driven until the first column of apertures therein overlies the first column of scored areas in the punch card. The desired information is then entered in the punch card by inserting a stylus or the like in the appropriate apertures in the master roll and punching out the appropriate scored areas in the punch card. The roll 60 is then driven until the next column of apertures is aligned with the next column of scored areas and the desired information is entered. This process is continued for each column of information apertures in the roll 60.

It is to be noted that, with the information roll 60 removed or with the information assembly 70 removed from the housing, the apertures in the punch card can be "read" for stored information by means of the numbers in the base 71 which can be seen through the apertures in the support plate 72.

The various portions of the apparatus 10 may be assembled in any suitable manner, as those skilled in the art will understand. In one suitable arrangement, the base plate of the housing may be hinged to open, or it may be removable to reveal the inside of the housing. The supply reel and takeup reel may be spring-locked in suitable slots or depressions in the side walls so that they can be removed for loading of an information roll and then replaced. The information-entering assembly may be supported in the housing in a number of ways. For example, it may include a lip which engages the top wall 26 surrounding the aperture 50 after the assembly has been dropped into the aperture. It might also rest on cross braces mounted inside the housing between the side walls. With respect to the information housing, it may include narrow ledges on its inner walls on which the apertured plate and the punch card can be supported.

What is claimed is:

1. Information-handling apparatus including:
a housing,
a pair of reels in said housing comprising a supply reel and a takeup reel,
a master information roll carried between said reels, said master information roll including a plurality of columns of apertures, each aperture associated with a unit of information, the columns being offset laterally and longitudinally from each other, and
information-receiving means associated with said master information roll for entering information therein corresponding to information in said master roll.

2. The apparatus defined in claim 1 wherein the first column of apertures in said master information roll is oriented parallel to and adjacent to an edge of said roll, the second column of apertures being oriented parallel to said edge of said roll and spaced laterally and longitudinally from said first column of apertures.

3. The apparatus defined in claim 1 wherein the first column of apertures in said master information roll is oriented parallel to and adjacent to an edge of said roll, the second column of apertures being oriented parallel to said edge of said roll and spaced laterally and longitudinally from said first column of apertures,
said information-receiving means being positioned in said housing beneath said master information roll which is secured between said pair of reels,
said information-receiving means including a card which has a plurality of columns of information-receiving regions, each of which is related to an aperture in said master information roll.

4. The apparatus defined in claim 1 wherein the first column of apertures in said master information roll is oriented parallel to and adjacent to an edge of said roll, the second column of apertures being oriented parallel to said edge of said roll and spaced laterally and longitudinally from said first column of apertures,
said information-receiving means being positioned in said housing beneath said master information roll which is secured between said pair of reels,
said information-receiving means including (1) a card which has a plurality of columns of information-receiving regions, each of which is related to an aperture in said master information roll, and (2) an apertured support plate for supporting said card, said support plate having an aperture for each information-receiving region in said card.

5. The apparatus defined in claim 1 wherein the first column of apertures in said master information roll is oriented parallel to and adjacent to an edge of said roll, the second column of apertures being oriented parallal to said edge of said roll and spaced laterally and longitudinally from said first column of apertures,
said information-receiving means being positioned in said housing beneath said master information roll which is secured between said pair of reels,
said information-receiving means including (1) a punch card which has a plurality of columns of punch-out areas, each of which is related to an aperture in said master information roll, (2) an apertured support plate for supporting said card, said support plate having an aperture for each information-receiving region in said card, and (3) a read-back means positioned beneath said support plate.

6. The apparatus defined in claim 1 wherein the first column of apertures in said master information roll is oriented parallel to and adjacent to an edge of said roll, the second column of apertures being oriented parallel to said edge of said roll and spaced laterally and longitudinally from said first column of apertures,
said information-receiving means being positioned in said housing beneath said master information roll which is secured between said pair of reels,
said information-receiving means including (1) a punch card which has a plurality of columns of areas, each of which can be punched out and each of which is related to an aperture in said master information roll, (2) an apertured rigid support plate for supporting said punch card, said support plate having an aperture for each punch-out area in said card, and (3) read-back means beneath said support plate including columns of indicia corresponding in number and position to the columns of information units in said master information roll.

References Cited

UNITED STATES PATENTS 3,144,720 8/1964 Kehl -------------- 35—48 X

JAMES M. MEISTER, *Primary Examiner.*